United States Patent [19]

Morva et al.

[11] 4,358,374
[45] Nov. 9, 1982

[54] STRIPPING APPARATUS FOR THE REMOVAL OF CONTAMINANTS FLOATING ON A LIQUID

[75] Inventors: Alajos Morva; Ferenc Somogyi, both of Budapest, Hungary

[73] Assignee: Mirköz Diesel és Hütötechnikai Szövetkezet, Budapest, Hungary

[21] Appl. No.: 36,684

[22] Filed: May 7, 1979

[51] Int. Cl.³ .............................................. B01D 17/02
[52] U.S. Cl. .................................. 210/242.3; 210/538
[58] Field of Search ............... 210/242.1, 242.2, 242.3, 210/242.4, 538, 923

[56] References Cited

U.S. PATENT DOCUMENTS

| | | | |
|---|---|---|---|
| 3,469,402 | 9/1969 | Lowd | 210/DIG. 25 |
| 4,046,691 | 9/1977 | Truns | 210/83 |
| 4,059,526 | 11/1977 | Middelbeek | 210/242 S |
| 4,126,552 | 11/1978 | Middelbeek | 210/242 S |

FOREIGN PATENT DOCUMENTS 169472 9/1977 Hungary.

Primary Examiner—Ernest G. Therkorn
Attorney, Agent, or Firm—Karl F. Ross

[57] ABSTRACT

A stripping apparatus for the removal of contaminants floating on a liquid and having a lower specific weight than that of the liquid, in which the liquid is introduced into a basin having a separator housing open at the top and bottom and provided with a downwardly sloping blade which extends beneath the surface of the liquid and guides the contaminants, which are driven up the sloping blade by forced air directed against the blade by a nozzle, and into the open top of the separator housing, which is provided with a discharge tube having an inlet mouth which lies above the surface of the liquid to be purified and below the top of the layer developed in the separator housing of the contaminants.

2 Claims, 1 Drawing Figure

STRIPPING APPARATUS FOR THE REMOVAL OF CONTAMINANTS FLOATING ON A LIQUID

FIELD OF THE INVENTION

The invention relates to a stripping apparatus for the removal of contaminants floating on a liquid, especially those having a lower specific gravity than that of the liquid, particularly for the purification of oil-containing sewage, of the type which is equipped with a stretched oblong basin provided with a fan-shaped inlet for the sewage to be purified, arranged beneath the existing liquid level in the basin, with a stripping device provided with blades and fastened to floats, with a discharge tube for contaminations of lower specific weight and, if necessary, for percipitating contaminations of higher specific weight, where the stripping device has nozzles with orifices directed towards the stripping knife.

BACKGROUND OF THE INVENTION

A problem constantly present in several branches of industry is the removal of floating contaminants of various liquids originating from various technologies. The rapid increase of the contamination of environment has called attention especially to the purification of industrial sewages and—taking into consideration also the economic aspects—to their recovery.

The floating contaminations in industrial sewages and other by-products in a liquid state can be divided into two groups according to the liquid to be purified, namely to substances of higher specific weight and to those of lower specific weight than that of the liquid in question. A further division is possible according to the solid or liquid state of the floating substance.

Numerous processes and equipment for the separation of substances of different state, specific weight and grain size are known. The individual or combined carrying out of precipitation, centrifuging and filtering processes is generally a power-consuming task, therefore where the by-pass of larger quantities of substances is necessary, precipitators requiring specifically the lowest energy, having the highest permeability and requiring the lowest establishment costs and operating costs are generally used alone or combined with other technological devices as required.

A detrimental property of the known precipitators-especially if the liquid to be purified contains impurities of both higher and lower specific weight, such as in the case of industrial sewages containing simultaneously sand and oil contaminations—consists in that requirements mutually depreciating to each other are combined in the same system.

In the various sedimentation basins of the most widely used systems and separating basins the sewage is coursed in laminar flow at a minimum speed in order to let settle the floating sand grains on the bottom of the basin, and to let ascend the oil drops to the surface. Since the ascended oil film is generally separated from the surface of the sewage by means of a separating or stripping device suspended into the basin, the sewage should be coursed at least at a speed rendering efficient the separation. Obviously, these two requirements are simultaneously impractical, therefore only a compromise is possible.

Another condition depreciating the practicality of meeting both of the above demands consists in that the sewage load is by no means uniform and its variation is sporadic. These sporadic variations, however, disturb the laminar flow and cause wave phenomena, especially on the surface, but also on the bottom agitating thus the already settled grains, and causing the liquid level to continuously vary in the basin, so that the separating element is sometimes freely hanging in the air and sometimes completely immersed in the liquid, carrying out no separation, or the wave sweeping in and the separating element being just on the surface fills the discharge channel with water and deteriorates the efficiency of separation or even prevents it.

To solve the above problems, a solution is presented in the Hungarian patent specification No. 169.472 according to which the stripping device is arranged on floats and is equipped with at least one row of nozzles, while the edge of the stripping blade is adjusted to or beneath the boundary surface of the sewage to be purified and the contamination ascended to the surface thereof.

The sole detrimental property of the known solution is with respect to the "quality" of the separated contamination, since it contains always a small quantity of the liquid to be purified. The edge of the stripping blade cannot be adjusted exactly to the boundary surface, so that the stripping blade is dipped in the liquid to be purified and the oil carries with it some water into the collecting channel.

OBJECTS OF THE INVENTION

The object of the present invention is to provide a solution by which completely "clear" contamination containing liquid to be purified only in traces can be separated.

SUMMARY OF THE INVENTION

This object is achieved according to the invention in which the back edge of the stripping blade 3 which includes a given acute angle with the horizontal, is in a liquid-sealed manner connected to the upper flange of a separator housing open at the top and bottom, where the upper flange of the separator housing reaches above the layer of the ascending contamination, and its lower flange penetrates deeply into the liquid to be purified, while in the inner space of the separator housing at least one discharge tube is flexibly connected to a drainpipe for the removal of the contamination of lower specific weight, the mouth opening of the discharge tube being above the existing surface of the liquid to be purified and beneath the surface of the ascended contamination developed in the separator housing.

BRIEF DESCRIPTION OF THE DRAWING

The invention will be new described by means of sole FIGURE of drawing of an embodiment of the invention. In the drawing, a part of the apparatus is shown in schematically longitudinal section.

SPECIFIC DESCRIPTION

Figure 1:
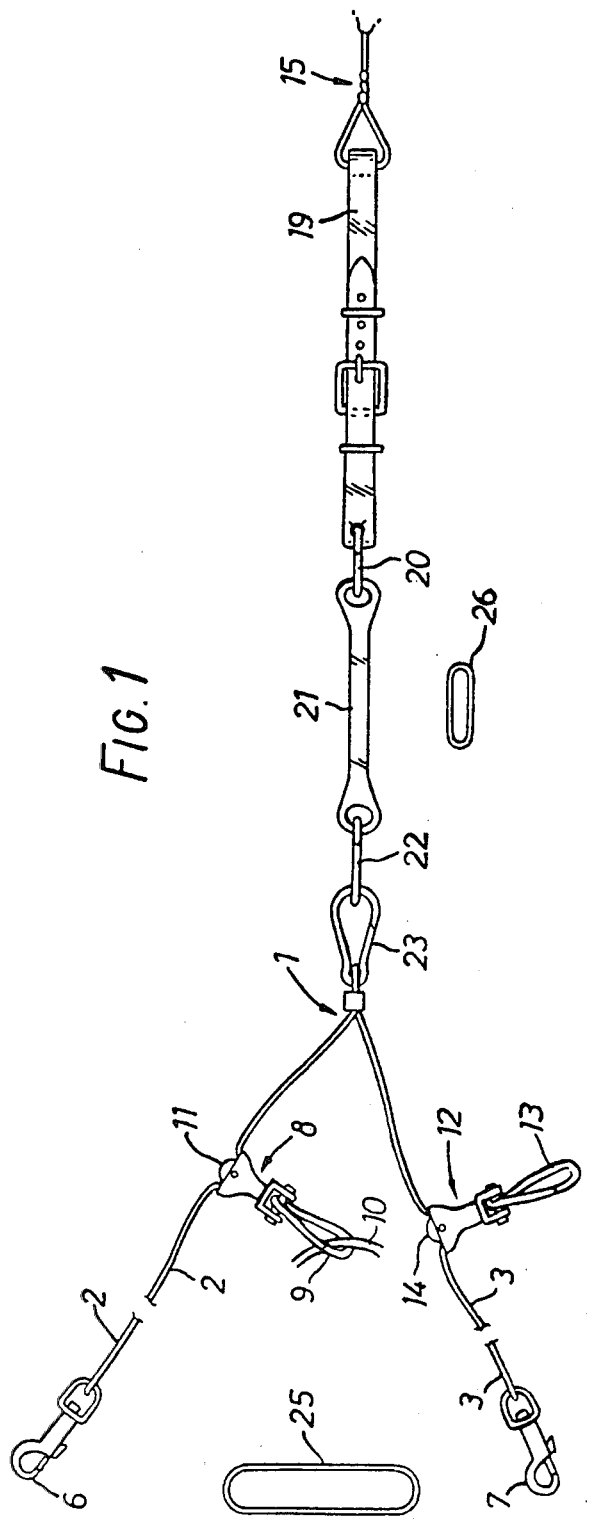

At the back section as compared to the flow direction of the liquid to be purified of the stretched oblong basin 1 the stripping device is arranged on the floats 2 on which the stripping blade 3 is fitted. Before the stripping blade 3 at least one nozzle row 4 is located, the mouth openings of which are directed towards the stripping knife 3.

The back edge of the stripping knife 3 is connected in a liquid-sealed manner to the front flange as compared to the flow direction, of the separator housing 5 open at the top and bottom. The floor plan of the separator housing 5 may be optional, expediently rectangular, the shorter sides of which are fastened to the floats 2. The upper flange of the separator housing 5 reaches above the existing liquid level, its lower flange, however, penetrates deeply into the liquid to be purified.

In our case the separator housing 5 is fully open at the bottom, but within the scope of invention, it may be produced in such a form that a bottom plate is provided at least with one opening. The essential requirement is that the separator housing 5 and the inner space of the basin 1 should be interconnected.

In the inner space of the separator housing 5 at least one discharge tube 6 is arranged which—in our case—is connected through a flexible corrugated metal tube 7 to the drainpipe 8 provided for the removal of the contaminants. On the threading at the mouth opening of the discharge tube 6 shown in the drawing is an adjusting ring 9. It should be noted that the adjusting ring 9 may be mounted on the discharge tube 6 in any other way, too.

The further elements not shown in the drawing of the equipment, such as, among others, the inlet profile, the discharge stub of the precipitator provided for contaminations of higher specific weight are, or may be developed according to the Hungarian patent specification No. 169.472, included the possibility of connection to the complete technological purifying line.

Now, the operation of the equipment according to the invention will be described.

The industrial sewage contaminated with oil, introduced into the basin 1 moves in a laminar flow, while the oil ascends to the surface and occasionally, the contaminants of higher specific weight precipitate during this time.

The layer 11 of the contamination floating on the surface 10 of the liquid to be purified is driven in forced flow to the stripping blade 3 extending beneath the surface 10, by means of gas, especially of air effusing from the nozzles 4. The flow rate of the liquid to be purified, and of the layer 11, respectively, is indicated by arrows 12, and 13.

For the sake of a troublefree and perfect operation of the equipment the stripping device should be adjusted in such a way that the stripping knife 3 should be directly beneath the surface 10 of the liquid to be purified, whereas the mouth opening of the discharge tube 6, and the upper plane of the adjusting ring 9, respectively, should be at any rate, above that but beneath the surface 14 of the already stripped contamination in the separator housing 5.

The essence of the operation of the equipment according to the invention, and its decisive advantage consist in that the liquid to be purified carried with the contamination being in forced flow into the separator house 5 precipitates from the contamination, thus exclusively "clear" contamination, containing at most traces of the liquid to be purified, enters into the discharge stub.

The accuracy of the separation, and of the stripping, respectively, can be regulated and controlled by the adjustment of the stripping blade 3, on the one hand, and the adjusting ring 9, on the other hand, in two stages.

Finally, a pilot experiment will be described as an example, where in a basin of 2.2×4.0 m area and containing 5.28 cu.m quiet water, fuel oil of type TH 5/22 is poured. By means of the equipment according to the invention, 28.5 l fuel oil could be separated, whereas in the separator housing about 0.2 fuel oil remained on the surface of the water.

The separated fuel oil was then burned in a household oil stove, no anomaly from which the presence of water could be concluded, was experienced.

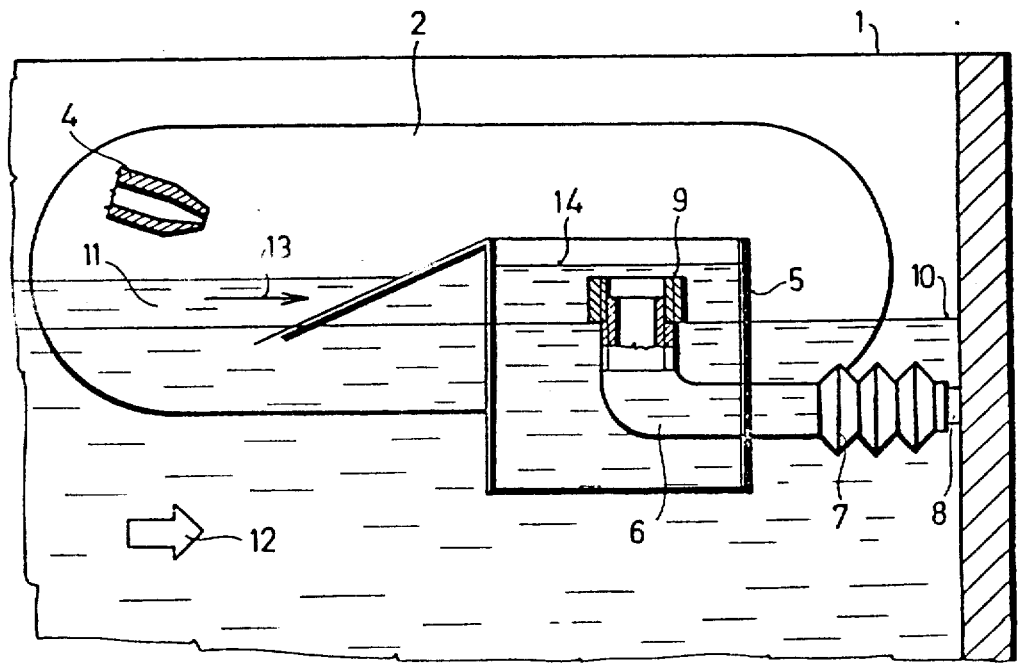

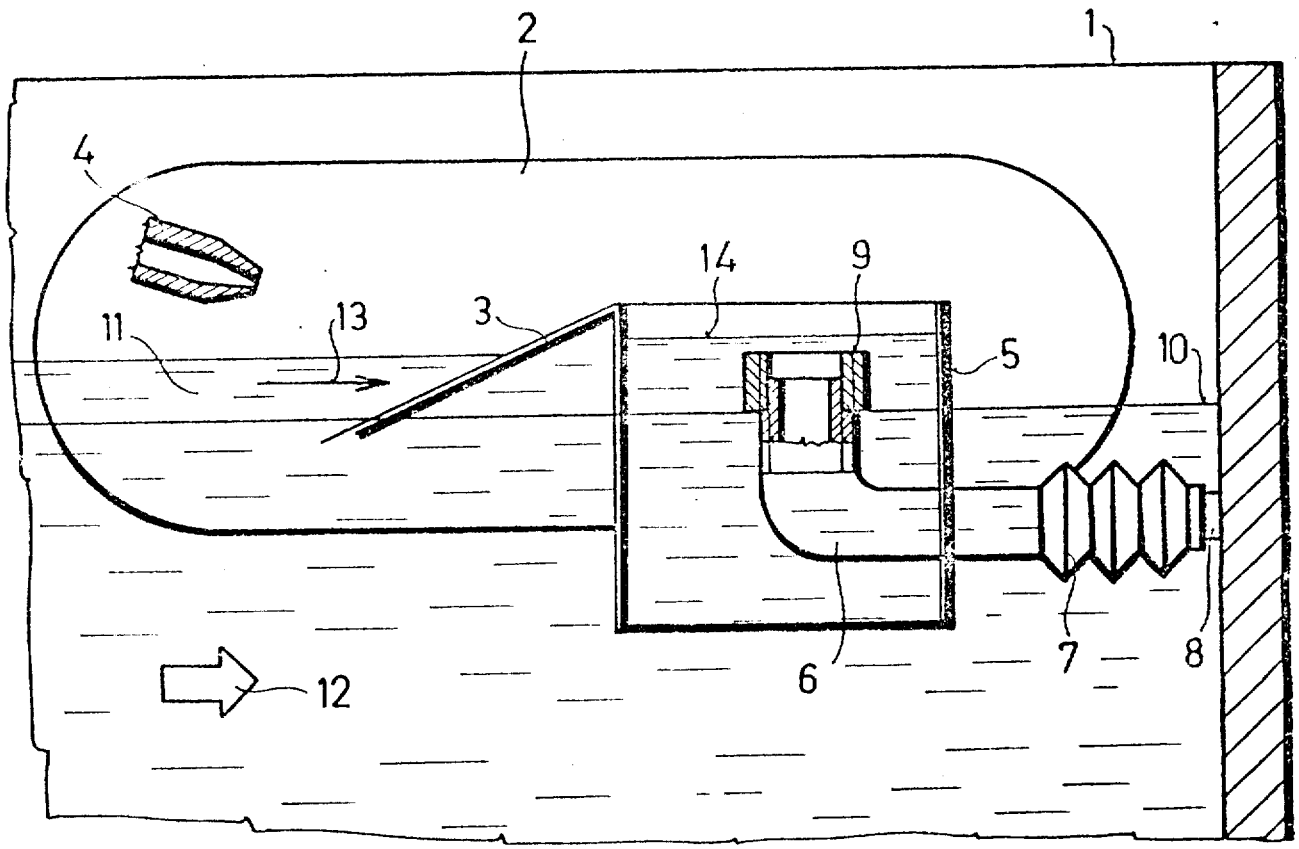

What we claim is:

1. An apparatus for the removal of contaminants floating on a liquid, comprising:
    a basin containing a liquid having a layer of contaminants floating thereon;
    a separator in said basin having a housing open at the top and bottom;
    at least one flotation device connected to said housing for maintaining the open top thereof above the top of said layer;
    a blade forming an upwardly sloping ramp extending from a location beneath the surface of said liquid and connected to an upper edge of said housing for guiding said contaminants into said housing:
    at least one nozzle in said basin for directing a stream of forced air against said blade and driving said contaminants upwardly therealong into said housing whereby said contaminants form an enclosed contaminant layer therein;
    a discharge tube extending downwardly into said housing having an upper inlet end positioned with the opening above the surface of said liquid and below the top of said enclosed contaminant layer; and
    a flexible conduit connected between a lower outlet end of said discharge tube and a drainpipe in said basin for the removal of said enclosed contaminants.

2. The apparatus defined in claim 1, further comprising a collar threaded onto said inlet end of said discharge tube for adjusting the position of the opening within said enclosed contaminant layer.

* * * * *

UNITED STATES PATENT AND TRADEMARK OFFICE
CERTIFICATE OF CORRECTION

PATENT NO. : 4,358,374                      Page 1 of 3

DATED : Nov. 9, 1982

INVENTOR(S) : Alajos Morva et al.

It is certified that error appears in the above-identified patent and that said Letters Patent is hereby corrected as shown below:

The title page should be deleted to appear as per attached title page.

Figure 2:
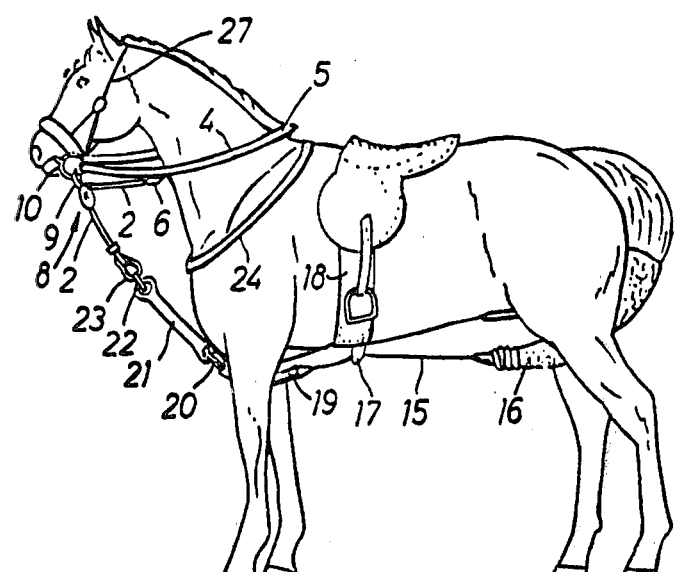
Figure 3:
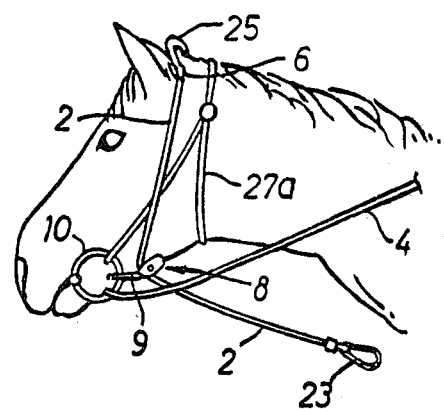

The sheets of drawings containing Figures 1 to 3 should be deleted and the attached Figure substituted therefor.

Signed and Sealed this

Second Day of April 1985

[SEAL]

Attest:

DONALD J. QUIGG

Attesting Officer        Acting Commissioner of Patents and Trademarks

United States Patent [19]

Morva et al.

[11] 4,358,374
[45] Nov. 9, 1982

[54] STRIPPING APPARATUS FOR THE REMOVAL OF CONTAMINANTS FLOATING ON A LIQUID

[75] Inventors: Alajos Morva; Ferenc Somogyi, both of Budapest, Hungary

[73] Assignee: Mirköz Diesel és Hütötechnikai Szövetkezet, Budapest, Hungary

[21] Appl. No.: 36,684

[22] Filed: May 7, 1979

[51] Int. Cl.³ ............................................. B01D 17/02
[52] U.S. Cl. ................................. 210/242.3; 210/538
[58] Field of Search ............... 210/242.1, 242.2, 242.3, 210/242.4, 538, 923

[56] References Cited

U.S. PATENT DOCUMENTS

| | | | |
|---|---|---|---|
| 3,469,402 | 9/1969 | Lowd | 210/DIG. 25 |
| 4,046,691 | 9/1977 | Truns | 210/83 |
| 4,059,526 | 11/1977 | Middelbeek | 210/242 S |
| 4,126,552 | 11/1978 | Middelbeek | 210/242 S |

FOREIGN PATENT DOCUMENTS 169472  9/1977  Hungary .

*Primary Examiner*—Ernest G. Therkorn
*Attorney, Agent, or Firm*—Karl F. Ross

[57] ABSTRACT

A stripping apparatus for the removal of contaminants floating on a liquid and having a lower specific weight than that of the liquid, in which the liquid is introduced into a basin having a separator housing open at the top and bottom and provided with a downwardly sloping blade which extends beneath the surface of the liquid and guides the contaminants, which are driven up the sloping blade by forced air directed against the blade by a nozzle, and into the open top of the separator housing, which is provided with a discharge tube having an inlet mouth which lies above the surface of the liquid to be purified and below the top of the layer developed in the separator housing of the contaminants.

2 Claims, 1 Drawing Figure